US009344397B2

(12) United States Patent
Iyer

(10) Patent No.: US 9,344,397 B2
(45) Date of Patent: *May 17, 2016

(54) CLIENT AWARE DHCP LEASE MANAGEMENT

(75) Inventor: Pradeep Iyer, Cupertino, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 426 days.

This patent is subject to a terminal disclaimer.

(21) Appl. No.: 13/246,587

(22) Filed: Sep. 27, 2011

(65) Prior Publication Data

US 2013/0080614 A1 Mar. 28, 2013

(51) Int. Cl.
*G06F 15/16* (2006.01)
*H04L 29/12* (2006.01)

(52) U.S. Cl.
CPC ........ *H04L 61/2015* (2013.01); *H04L 61/2053* (2013.01)

(58) Field of Classification Search
CPC .................... H04L 61/2015; H04L 29/12226; H04L 29/12283; H04L 29/12301; H04L 61/2061; H04L 61/2076
USPC ........................................................ 709/223
See application file for complete search history.

(56) References Cited

U.S. PATENT DOCUMENTS 6,473,411 B1 10/2002 Kumaki et al.
7,054,944 B2 5/2006 Tang et al.
7,114,070 B1 9/2006 Willming et al.
7,421,499 B1 * 9/2008 Lanahan et al. .............. 709/226
7,792,942 B1 * 9/2010 Regan et al. .................. 709/223
8,054,804 B2 11/2011 Small et al.
8,301,753 B1 * 10/2012 Melvin ......................... 709/224
8,375,109 B1 2/2013 Lange et al.
2004/0185777 A1 * 9/2004 Bryson ........................ 455/41.1
2006/0195610 A1 * 8/2006 Cole et al. ..................... 709/245
2006/0218252 A1 * 9/2006 Ford ............................. 709/220

(Continued)

FOREIGN PATENT DOCUMENTS

WO 2005/060208 A1 6/2005

OTHER PUBLICATIONS

Khadilkar, Manas, et al. 2007. "Usage Based DHCP Lease Time Optimization" Retrieved on Dec. 2, 2013 from <http://conferences.sigcomm.org/imc/2007/papers/imc17.pdf>.*

(Continued)

*Primary Examiner* — Brian J Gillis
*Assistant Examiner* — Juan C Turriate Gastulo
(74) *Attorney, Agent, or Firm* — Hewlett Packard Enterprise Patent Department

(57) ABSTRACT

The management of DHCP address leased based on client properties is described. According to a method of operation, clients are managed in a wireless digital network by modifying a requested lease time for an assigned Internet Protocol (IP) address based on properties of a client requesting the lease time. The assigned IP address is released if (i) no communication activity is detected by the client for a prescribed duration or (ii) upon detecting a DHCP Release message from the client. When the DHCP server receives a renewal request, it checks if the client has generated more than a predetermined amount of traffic. If the client has generated traffic exceeding this threshold level, the lease is renewed for a longer period. If the client traffic has not met the threshold level, the lease is renewed with the short lease time.

26 Claims, 2 Drawing Sheets

(56) References Cited

U.S. PATENT DOCUMENTS

| | | | | |
|---|---|---|---|---|
| 2007/0147299 | A1 | 6/2007 | Ando et al. | |
| 2007/0237148 | A1 | 10/2007 | Jabr et al. | |
| 2008/0008197 | A1* | 1/2008 | Sakanashi et al. | 370/401 |
| 2008/0281973 | A1* | 11/2008 | Yang | 709/228 |
| 2009/0172174 | A1* | 7/2009 | Zha | 709/228 |
| 2009/0232020 | A1* | 9/2009 | Baalbergen et al. | 370/254 |
| 2009/0307338 | A1* | 12/2009 | Arberg et al. | 709/221 |
| 2010/0191839 | A1* | 7/2010 | Gandhewar et al. | 709/220 |
| 2011/0137879 | A1* | 6/2011 | Dubey et al. | 707/704 |
| 2011/0243003 | A1* | 10/2011 | Oguchi | 370/252 |
| 2012/0198046 | A1* | 8/2012 | Shah et al. | 709/228 |

OTHER PUBLICATIONS

Droms, O., "Dynamic Host Configuration Protocol", Network Working Group, Request for Comments: 2131, Obsoletes: 1541, Category: Standards Track, http://www.ietf.org/rfc/rfc2131.txt[May 10, 2012 1:27:59 PM], Bucknell University, Mar. 1997, 32 pages.

Droms, Ed. R. et al., "Dynamic Host Configuration Protocol for IPv6 (DHCPv6)", Network Working Group, Request for Comments: 3315, Category: Standards Track, http://www.ietf.org/rfc/rfc3315.txt[May 10, 2012 1:26:31 PM], Jul. 2003, 70 pages.

Troan, O. et al., "IPv6 Prefix Options for Dynamic Host Configuration Protocol (DHCP) version 6", Network Working Group, Request for Comments: 3633, Category: Standards Track, http://www.ietf.org/rfc/rfc3633.txt[May 10, 2012 1:26:58 PM], Cisco Systems, Dec. 2003, 14 pages.

Droms, R., "Stateless Dynamic Host Configuration Protocol (DHCP) Service for IPv6", Network Working Group, Request for Comments: 3736, Category: Standards Track, http://tools.ietf.org/html/rfc3736[May 10, 2012 1:27:33 PM], Cisco Systems, Apr. 2004, 7 pages.

Microsoft Technet, "Determining Lease Duration:Dynamic Host Configuration Protocol (DHCP)", retrieved on Dec. 5, 2013, available at <http://technet.microsoft.com/en-us/library/cc783573(v=ws.10).aspx>, Mar. 28, 2003, 2 pages.

* cited by examiner

CLIENT AWARE DHCP LEASE MANAGEMENT

FIELD OF THE INVENTION

The present invention relates to wireless digital networks, and more particularly, to the problem of managing addresses assigned to clients through Dynamic Host Configuration Protocol (DHCP).

GENERAL BACKGROUND

Data networks, particularly wireless data networks, have become an expected or necessary resource in more and more situations. Once present only in the workplace environment, they are now nearly ubiquitous, present in schools, libraries, retail environments, and just about anyplace where people gather.

Operating wireless networks, particularly in environments handling large numbers of users and/or devices present a number of challenges. The operating environment has changed dramatically within the last few years, from a user having a single device such as a laptop computer with wireless capability, to a single user having multiple devices each with such capability, such as laptops, smart phones, tablets, and portable music players.

To work with a local wireless network, a device first uses the DHCP protocol to request an address which the device will use while associated to the network. This address is supplied by a DHCP server. The number of distinct addresses available to the DHCP server is determined by its configuration and is finite. A DHCP server is considered to own the IP addresses it manages, and leases them to clients. A DHCP server responds to requests by returning an address (if one is available) which is valid for a predetermined period of time, known as the DHCP lease time. DHCP servers may also work through DHCP relays, which are used to administer subnets.

DHCP is known to the art, described for example in RFC 2131 for IPv4 networks, and described in RFC 3315, RFC 3633 and RFC 3736 for DHCPv6 in IPv6 networks.

Particularly in IPv4 environments where multiple users with multiple devices congregate, the finite number of distinct addresses available through a DHCP server may turn out to be a limiting factor in supporting users on the network.

It has also become apparent in monitoring such networks that while there may be a large number of devices associated to a network, only a fraction of those devices are active. Yet each associated device is tying up an address.

It is known to the art that in environments where the number of users may exceed the number of addresses available, short lease times should be used to free up unused addresses and make them available.

The seemingly simple and straightforward solution of having the DHCP server only grant short leases, two minutes, for example, does not work. To be motivated to attempt such a solution, one has to have a network environment in which users exceed available addresses; a very busy environment. In such an environment, issuing only short leases will result in an overloaded DHCP server and network segments flooded with DHCP traffic.

What is needed is a better way to manage DHCP leases.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of managing DHCP leases based on client properties. Short or long lease times are assigned to clients based on properties such as device type, OUI, client location, or client activity.

In one embodiment, device type may be identified from the device OUI or derived from device OUI. Based on device type, highly mobile devices such as smart phones and tablets may be assigned short lease times.

In one embodiment, short lease times may be assigned to devices based on client location, such as through one or more access points covering a particular area.

In one embodiment lease times are based on client activity. A DHCP server allocates addresses with an initial short lease time, as an example, a few minutes. When a DHCP Renew request is received, the DHCP server queries client network activity. If client activity is above a predetermined level, the DHCP server renews the lease with a longer interval, for example, an hour. If the client activity is below the predetermined level, another short lease time is given.

In one embodiment, a DHCP Relay mediates between the client and DHCP server. The DHCP Relay monitors the offer—ack process by returning a short lease to the client. If this short lease expires, or the client device disconnects, the DHCP relay issues a release to the DHCP server. The DHCP Relay handles client DHCP Renew requests, renewing for a short lease if the client activity is below the predetermined level, otherwise renewing for a long lease time.

Figure 1:
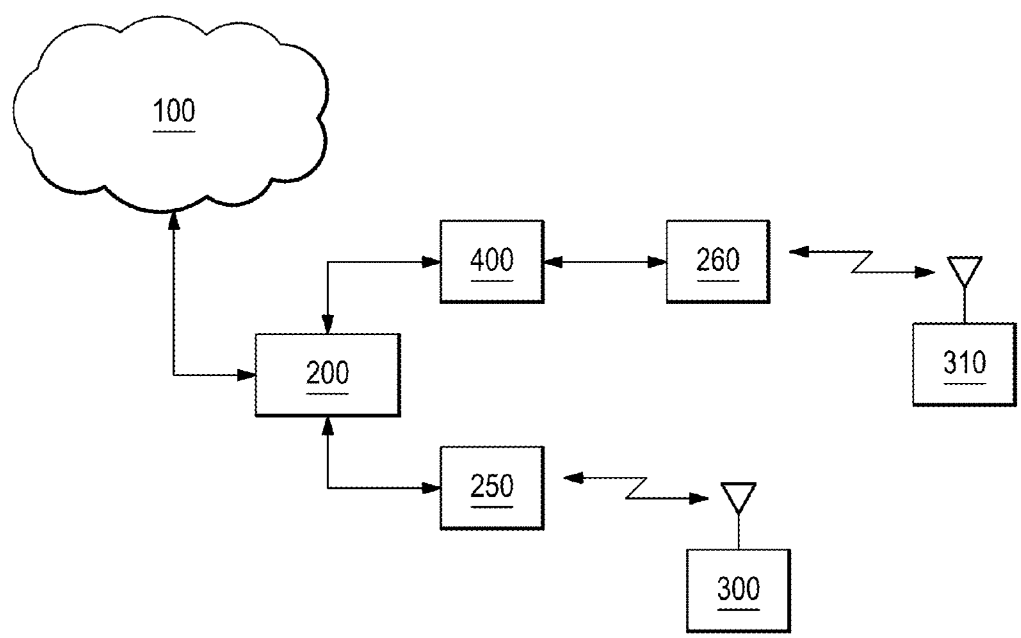
FIG. 1 shows devices in a network.

According to the present invention and as shown in FIG. 1, a client device 300 wishing to communicate with network 100 first acquires an address by communicating with DHCP server 200.

As shown in FIG. 1, wireless client devices 300 and 310 wish to communicate with other devices on network 100. Client devices 300 and 310 are served by wireless access points 250 and 260. Wireless access point 250 is in direct communication with DHCP Server 200, while wireless access point 260 goes through DHCP Relay 400.

As is understood in the art, wireless access points 250 and 260 are purpose-built digital devices, each containing a processor, a memory hierarchy, and input/output interfaces. Such devices typically operate under the control of an operating system such as Linux, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

DHCP server 200 and DHCP relay 400 may be hosted on distinct hardware platforms, each containing one or more processors, a memory hierarchy, and input/output interfaces, or the DHCP server and DHCP relay functionality may be hosted on another network device, such as a router, switch, controller, or access point.

Client devices 300 and 310 are also digital devices containing a processor, memory hierarchy, and input/output interfaces, including a wireless interface such as an IEEE 802.11 wireless interface for communicating with wireless access points 250 and 260. Typical wireless client devices 300, 310 include but are not limited to laptop and netbook computers, wireless phones, wireless music players, and other wireless devices such as barcode scanners, instruments, and the like.

For clarity, FIG. 1 does not show other typical network devices such as switches, routers, firewalls, and the like which are well understood by the art.

Figure 2:
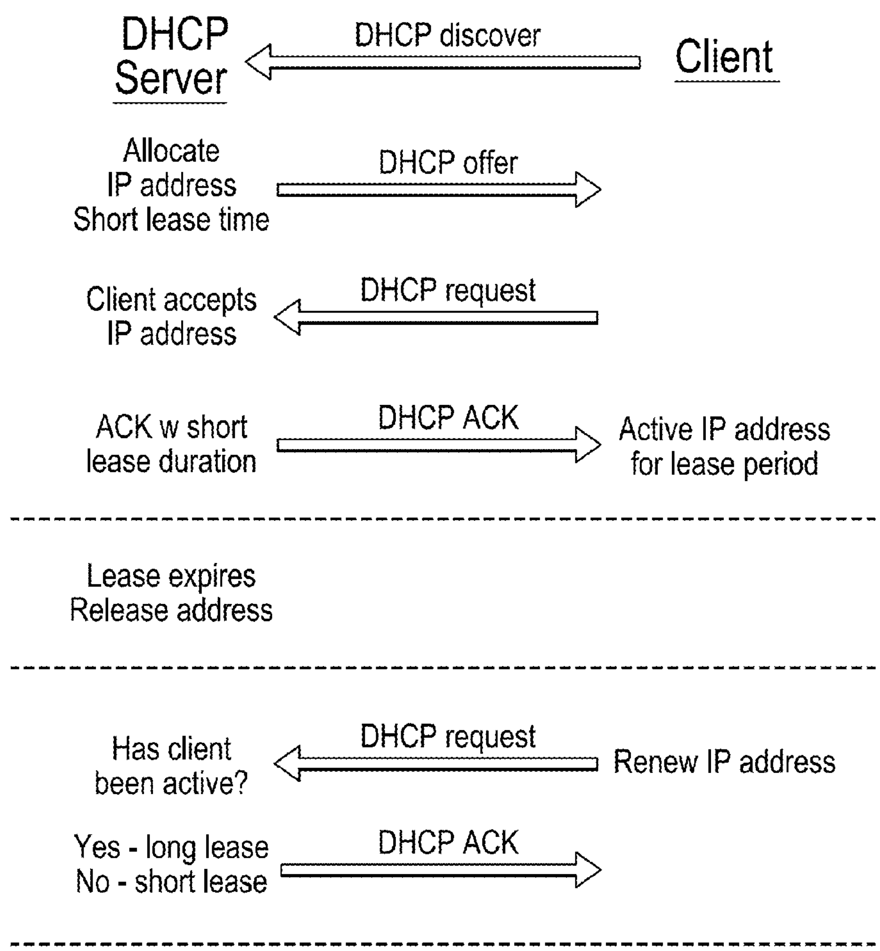
FIG. 2 illustrates an aspect of the invention.

According to the present invention, and as shown in FIG. 2, for a client device 300 to operate on a digital network, it must first acquire an address, which it does using the DHCP protocols. These protocols are used in both wired (such as IEEE 802.3) and wireless (such as IEEE 802.11) networks.

DHCP is known to the art, described for example in RFC 2131 for IPv4 networks, and described in RFC 3315, RFC 3633 and RFC 3736 for DHCPv6 in IPv6 networks. While the examples herein given are with respect to IPv4 networks, they are equally applicable to IPv6 networks.

Client device 300 begins the process by sending out a DHCP discover request. This request contains the client's unique MAC address. As is known in the art, the first three octets of the MAC address are the OUI as assigned by the IEEE Registration Authority and identify the manufacturer of the device.

In one embodiment of the invention, lease time is based on client device type. DHCP server 200 receives the client request, whether direct from the client or through a DHCP relay, and allocates an IP address with a lease time based on client device type. Device type may be based on the device OUI, derived from the device OUI, or may be derived from previous operating characteristics of the device recorded by MAC address. Tables mapping OUIs or MAC addresses to device types may be kept in the DHCP server, or elsewhere on the network for lookup use. As an example, highly mobile devices such as smart phones and tablets may be given short lease times, while less mobile devices, such as workstations or printers may be given longer lease times.

In one embodiment of the invention, address lease time may be based on client location. As an example, an educational institution may wish to have a 1 hour lease time in lecture hall and lab locations, longer lease times in faculty/staff areas, and short lease times in high-mobility locations such as cafeterias and commons areas.

In one embodiment of the invention, address lease time may be based on time of day or other calendar/time basis. As an example, a college library may wish to use short lease times during peak usage periods, but fall back to longer lease times in periods of lower use, such as Friday and Saturday nights.

In one embodiment of the invention address lease time is based on client activity. Assume client 300 is in direct communication with DHCP Server 200. Client 300 sends out a DHCP discover request. DHCP server 200 responds with a DHCP Offer, allocating an IP address to the client and according to the invention, assigning a short lease time to the offer.

Client 300 accepts the offer by responding with a DHCP Request, accepting the IP address for the short duration specified in the DHCP Lease.

DHCP Server 200 responds with a DHCP ACK, and the IP address is assigned to the client device MAC for the short lease duration.

According to the invention, using an initial short lease quickly ages out inactive devices. After the short initial DHCP lease period, if client 300 has gone inactive, the lease expires and DHCP Server 200 returns the address to the DHCP pool, where it may be reused by a different client device seeking an address.

Prior to the expiration of the short DHCP lease period, a client 300 may renew the DHCP lease through a DHCP Request.

According to the present invention, DHCP server 200 tests to see if client 300 has been active on the network. This may be accomplished, for example, by querying a controller or access point through which client 300's traffic flows. Traffic may be measured for example in terms of sessions, packets, bytes, or other measures of network use by the client. For example in the case of the wireless network shown in FIG. 1, client 300 connects to the network through wireless access point 250 All data to and from client 300 flows through AP 250. The AP may, for example, track sessions initiated by client 300, or may track data to and from the device.

According to the invention, if client 300 has been active, a DHCP ACK is returned renewing the lease for a long period. If client 300 has not been active, a DHCP ACK is returned renewing the lease for another short period. Renewing the lease for a short period on devices which have not met an activity threshold continues the goal of aging out inactive devices through the use of short lease times.

In an additional embodiment of the invention where lease time is based on client activity, a DHCP Relay 400 is between client 310 and DHCP server 200. DHCP Relays are known to the art, and are used when a single DHCP server is used to provide IP addresses over multiple subnets. In such instances, DHCP Relays are used in each subnet to provide DHCP services to clients which do not have direct access to a DHCP server. In operation a client on a local subnet broadcasts a DHCP request, which is received by the DHCP Relay. The DHCP Relay then unicasts the DHCP request to the DHCP Server, which unicasts a response to the DHCP Relay. The DHCP Relay then retransmits the response on the local subnet.

Performing the steps of the present invention in a DHCP Relay allows the invention to be performed in a system using an older, legacy DHCP server, without needing to alter or replace that DHCP server.

DHCP Relay 400 may then take generic leases returned by DHCP server 200 and return lease times to clients based on client properties. As described above, these properties may include device type, OUI, client location, and/or client activity.

DHCP Relay 400 also issues DHCP Releases to DHCP server 200 when a short lease to a client expires, or the client disconnects from the network without issuing a DHCP Release.

According to an embodiment of the invention, when client 310 issues a DHCP discover, this request is received by DHCP Relay 400 and unicast to DHCP Server 200. DHCP Server 200 unicasts a DHCP Offer to DHCP Relay 400, allocating an address in the local subnet for client 310. DHCP Relay 400 rewrites the lease time in this DHCP Offer to a short lease time and retransmits the DHCP Offer on the local subnet to client 310. DHCP Relay 400 mediates the DHCP Request response from client 310, forwarding it to DHCP Server 200, which responds with a DHCP ACK, which DHCP Relay 400 sends to client 310.

According to the present invention, even if, for example, DHCP Server 200 issues uniform 8 hour DHCP leases, DHCP Relay 400 rewrites these to short DHCP Leases. If the short DHCP lease to client 310 expires, DHCP Relay 400 issues a corresponding DHCP Release to DHCP Server 200 to return that address to the available IP pool for the subnet supported by DHCP Relay 400. DHCP Relay 400 will also initiate a DHCP Release to DHCP Server 200 on behalf of client 310 if client 310 disconnects without initiating a DHCP Release. This reinsures that context is cleared for short-lived clients, and their IP addresses are returned to the available pool.

DHCP Relay 400 mediates DHCP Renew requests from client 310. As previously described, in one embodiment of the invention, if client 310 has been active, a DHCP ACK is returned by DHCP Relay 400 renewing the lease for a long period. If client 310 has not been active, a DHCP ACK is returned by DHCP Relay 400 renewing the lease for another short period. Renewing the lease for a short period on devices which have not met an activity threshold continues the goal of aging out inactive devices through the use of short lease times.

It should be understood that the steps and processes of the present invention are performed by a DHCP Server and/or DHCP Relay being hosted on a suitable device on the network such as a controller, a dedicated host, or an access point. Similarly, the client device may be a laptop or desktop computer, tablet, handheld device, or fixed-function device capable of performing the methods described herein.

The present invention may be realized in hardware, software, or a combination of hardware and software. A typical combination of hardware and software may be a network server or access point with a computer program that, when being loaded and executed, controls aspects of the host device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A non-transitory computer readable medium comprising instructions, which, when executed by one or more hardware processors, cause a network device to:

forward, to a DHCP server, a first DHCP request message received from a client device;

receive a DHCP response message from the DHCP server;

rewrite the DHCP response message received from the DHCP server to include a first lease time of an Internet Protocol (IP) address and forward the rewritten DHCP response message to the client device, wherein the first lease time is determined based at least on a client property associated with the client device;

forward, to the DHCP server, a DHCP renew request message received from the client device upon expiration of the first lease time;

determine whether the client device has been active during the first lease time by querying a controller through which traffic of the client device flows;

responsive to the client device having been active during the first lease time, forward to the client device a DHCP renew response message received from the DHCP server, wherein the DHCP renew response message has a second lease time that is longer than the first lease time; and responsive to the client device having been inactive during the first lease time, rewrite the DHCP renew response message to include a lease time equal to the first lease time and forward the rewritten DHCP renew response message to the client device.

2. The medium of claim 1, where the network device is a DHCP relay device.

3. The medium of claim 1 wherein the client property is a device type.

4. The medium of claim 3 wherein the device type is determined from a device Organizationally Unique Identifier (OUI).

5. The medium of claim 1 wherein the DHCP response message received from the DHCP server includes an IP address lease time, wherein the instructions are to cause the network device to shorten the IP address lease time in the DHCP response message to create the first lease time.

6. The medium of claim 3 wherein the client property comprises one or more previously determined device operating characteristics.

7. The medium of claim 1 wherein the client property is a client location.

8. The medium of claim 1 wherein the network device is a wireless access point.

9. The medium of claim 1 wherein the client property is either a time or date.

10. The medium of claim 1 wherein the client property is a client device activity measurement.

11. The medium of claim 1, further comprising;

determining that the client device has disconnected from a network;

generating a DHCP Release message on behalf of the client device by the network device in response to determining that the client device has disconnected from the network;

transmitting the DHCP Release message on behalf of the client device to the DHCP server.

12. The medium of claim 11 wherein generating the DHCP Release message on behalf of the client device is performed further in response to determining that the client device disconnected from the network without issuing the DHCP Release message.

13. The medium of claim 1, wherein the instructions are further to cause the network device to:

monitor communication activity by the client device assigned to a particular IP address;

determine that no communication activity is detected from the client device for a threshold duration of time; and cause release of the IP address assigned to the client device in response to determining that no communication activity is detected from the client device for the threshold duration of time.

14. The medium of claim 13, wherein causing the release of the assigned IP address is performed by a second network device interposed between the client device and the DHCP server.

15. The medium of claim 13, wherein causing the release of the assigned IP address is performed by transmitting a DHCP release message on behalf of the client device to the DHCP server.

16. A network device comprising:

a processor, and a non-transitory computer readable medium comprising instructions which, when executed by the processor, cause the processor to:

forward, to a DHCP server, a first DHCP request message received from a client device;

receive a DHCP response message from the DHCP server;

rewrite the DHCP response message received from the DHCP server to include a first lease time and forward the rewritten DHCP response message to the client device, wherein the first lease time is determined based at least on a client property associated with the client device;

forward, to the DHCP server, a DHCP renew request message received form the client device upon expiration of the first lease time;

determine whether the client device has been active during the first lease time by querying a controller through which traffic of the client device flows;

responsive to the client device having been active during the first lease time, forward to the client device the DHCP renew message received from the DHCP server, wherein the DHCP renew message has a second lease time, wherein the first lease time is a short lease time compared to the second lease time; and responsive to the client device having been inactive during the first lease time, rewrite the DHCP renew message to include another short lease time and the rewritten DHCP renew message to the client device.

17. The network device of claim 16, wherein the DHCP response message received from the DHCP server includes an IP address lease time, wherein the instructions are to cause the processor to shorten the IP address lease time in the DHCP response message to create the first lease time.

18. The network device of claim 16, wherein the network device is a DHCP relay device.

19. The network device of claim 16, wherein the client property is a device type.

20. The network device of claim 19, wherein the device type is determined from a device Organizationally Unique Identifier (OUI).

21. The network device of claim 19, wherein the device type is determined from a mapping of a device Organizationally Unique Identifier (OUI).

22. The network device of claim 19 wherein the client property comprises one or more previously determined device operating characteristics.

23. The network device of claim 16 wherein the client property is a client location.

24. The network device of claim 16 wherein the network device is a wireless access point.

25. The network device of claim 16 wherein the client property is either a time or date.

26. The network device of claim 16 wherein the client property is a client device activity measurement.

* * * * *